United States Patent [19]
Bergkvist et al.

[11] Patent Number: 5,929,314
[45] Date of Patent: Jul. 27, 1999

[54] METHOD AND APPARATUS FOR VOLUME DETERMINATION

[75] Inventors: Anders Bergkvist; Anders Bjurnemark, both of Malmö, Sweden

[73] Assignee: Dresser Industries, Inc., Dallas, Tex.

[21] Appl. No.: 08/964,381

[22] Filed: Nov. 6, 1997

[30] Foreign Application Priority Data

Nov. 7, 1996 [SE] Sweden .................................. 9604075

[51] Int. Cl.$^6$ ........................................................ G01F 1/12
[52] U.S. Cl. ............................................................ 73/1.36
[58] Field of Search ............................... 73/1.19, 1.21, 73/1.27, 1.28, 861.77, 861.79, 232, 239, 1.36; 702/100

[56] References Cited

U.S. PATENT DOCUMENTS 4,581,946   4/1986   Kanayama .
4,910,519   3/1990   Duell et al. .......................... 73/861.03

FOREIGN PATENT DOCUMENTS

0315738 A2   5/1989   European Pat. Off. .
2053485      6/1980   United Kingdom .

*Primary Examiner*—Robert Raevis
*Attorney, Agent, or Firm*—Haynes & Boone, L.L.P.

[57] ABSTRACT

In a method for determining the volume of liquid, such as fuel, being dispensed from a liquid pump unit, a correction of the number of pulses generated by a pulse generator corresponding to the volume flow rate when dispensing liquid is carried out. The purposes of the correction is to produce a predetermined number of pulses per unit of volume of the liquid. The correction preferably comprises disregarding a pulse for ever Nth produced pulse or adding a pulse in addition to the pulses generated for ever Nth generated pulse. This correction, which can be made continuously during volume determination and which does not require any multiplications, is preferably realized by a processor unit and its associated software in an apparatus for volume determination.

A method for carrying out calibration for determining N is also disclosed.

6 Claims, 3 Drawing Sheets

METHOD AND APPARATUS FOR VOLUME DETERMINATION

BACKGROUND OF THE INVENTION

The present invention relates to a method and an apparatus for determining the volume of liquid, such as fuel, being dispensed from a pump unit as well as a method for calibrating an apparatus for determining the volume of the liquid.

DESCRIPTION OF THE PRIOR ART

In certain liquid dispensing environments, a volume determining apparatus that is used in connection with a pump, such as a fuel pump unit at a gas station, must be able to perform volume determination with a predetermined minimum accuracy for different volume flow rates when filling up and. It should also be able to indicate the correct volume continuously during filling-up. To achieve such accuracy, the apparatus must be calibrated in manufacture and subsequently at regular intervals.

DE 29 26 451 discloses a volume measuring apparatus for a fuel pump unit having a measuring chamber, in which pistons are movably arranged. The pistons are displaced by the action of fuel flowing through the measuring chamber. The movement of the pistons is transmitted to a crankshaft, whose rotation is a function of the volume of the fuel flowing through the measuring chamber. The crankshaft extends through the wall of the measuring chamber, and on its end positioned outside the measuring chamber, a pulse generator is arranged. The pulse generator emits a predetermined number of pulses for each revolution of the crankshaft.

If the proportionality factor between the number of pulses and the volume is known, the volume of fuel flowing through the measuring chamber can be determined by counting the number of pulses emitted by the pulse generator and multiplying the counted number of pulses by the proportionality factor. The proportionality factor can be determined by a known volume of the liquid being dispensed form the the liquid pump unit and by determining the number of pulses generated by the pulse generator. Since the number of pulses emitted by the pulse generator is different for different volume measuring apparatus, depending on work tolerances and the stroke of the pistons, different proportionality factors will be obtained for different volume measuring apparatus.

However, the pulses are normally supplied from a pulse generator directly to a volume counter, which is incremented by a predetermined amount each time it receives a predetermined number of pulses. It is then desirable that the proportionality factor between the number of pulses and the volume be the same for different volume measuring apparatus. In other words, the same number of pulses should always be supplied to the counter when dispensing a given volume of the liquid, independently of the function of the pulse generator.

This can be accomplished by manually adjusting the stroke of the pistons in the measuring chamber, such that the desired ratio of pulses to volume is obtained. However, several attempts may be required, before the desired number of pulses is obtained, and therefore this is a time-consuming and inaccurate calibrating method.

In the above-mentioned DE 29 26 451, a pulse correction unit is instead arranged after the pulse generator. In this pulse correction unit, the number of pulses counted during a working cycle is multiplied by a correction factor, thereby obtaining the desired ratio of pulses to volume. The correction factor is determined by calibration, a desired number of pulses per working cycle being compared with an obtained number of pulses, and a correction factor being calculated on the basis of the ratio of the obtained number of pulses to the desired number of pulses. This correction factor is then adjusted manually by an adjusting member. The calculation of the correction factor and the manual adjustment thereof are, however, a source of error and besides increase the risk of somebody tampering with the volume apparatus.

This pulse correction method, however, also suffers from other drawbacks. If the correction factor is not an integer, which will probably be the case, the multiplication will normally result in a corrected pulse number which is not an integer, which is unfavorable if the corrected pulse number is to be used for incrementing a volume counter and which can result in considerable rounding errors. Moreover, this pulse correction method does not allow continuous incrementing of the volume since the pulse correction is carried out merely once per working cycle. A further drawback of this prior art apparatus is that the correction is carried out without regard to the flow rate when determining the volume. This results in insufficient accuracy since, as a rule, the number of pulses emitted by the pulse generator varies with the flow rate.

Applicant's previous application WO 88/08518 discloses an apparatus, in which the pulse correction is carried out continuously and with regard to the flow rate. In this apparatus, the volume determining period is divided into a number of measuring intervals. For each measuring interval, the pulses from the pulse generator are detected, each detected pulse is multiplied by a flow correction factor, which is determined on the basis of the sum of the corrected pulse values for one or more preceding measuring intervals, the corrected pulse values are added to a first summation variable, and the liquid volume is determined by the value of the first summation variable being multiplied by a volume conversion factor. Finally, the liquid volume is summed up for all measuring intervals during the measuring period.

This apparatus results in fact in a very accurate value of the volume, but places high demands on the hardware owing to the great amount of multiplications that should be executable in real time.

SUMMARY OF THE INVENTION

One object of the present invention therefore is to provide a method and an apparatus for determining the volume of the liquid being dispensed from a the liquid pump unit, said method and apparatus eliminating or at least reducing the above-mentioned drawbacks of prior-art technique.

A special object is to provide a simple pulse correction which allows accurate volume determination continuously during filling-up. The pulse correction should be carried out such that after correction a predetermined number of pulses per unit of volume is obtained.

A further object is that the method and the apparatus should allow the pulse correction to be carried out with regard to the volume flow rate during filling-up.

According to the present invention, pulses are thus generated by a pulse generator corresponding to a volume flow rate when dispensing liquid.

The pulse generator can be of any type whatever, optical, magnetic etc, which generates pulses corresponding to a volume flow rate. It can be affected in some convenient manner by the liquid volume flow anywhere between a pump and a dispenser for dispensing the liquid. Preferably, the pulse generator, however, is connected to a shaft which is affected by the flow through a measuring chamber in the same manner as in the prior-art technique.

Furthermore, according to the invention, a correction of the number of pulses generated by the pulse generator is carried out by at least one correction factor, such that the apparatus emits substantially a predetermined number of pulses per unit of volume of dispensed liquid.

By "substantially a predetermined number of pulses" is meant that the apparatus can be designed so as not to always emit exactly a predetermined number of pulses per unit of volume, but such that the deviation is so small that the desired measuring accuracy can be achieved.

According to the invention, the correction is carried out by taking one of the measures of disregarding a number of pulses of the pulses generated by the pulse generator and emitting a number of pulses in addition to the pulses generated by the pulse generator. The different alternatives are, of course, used when the pulse generator generates more or fewer pulses per unit of volume than the predetermined number. Preferably, the pulse generator is arranged in such manner that one of the alternatives is always used.

This technique of carrying out the pulse correction is very simple and, thus, inexpensive to accomplish. No complicated multiplications are required, just a simple subtraction or addition of pulses. Consequently, it can be carried out while using less sophisticated hardware than according to prior art.

The correction is suitably carried out for at least one first period of the volume determination. The first period can be equal to the entire period during which the volume determination takes place or it can constitute one or more parts thereof.

For this first period, the correction is carried out either by taking one of the above-mentioned measures for every Nth generated pulse, N constituting the correction factor and being an integer which is greater than one and which has been predetermined, for instance by calibration for said pulse generator. Thus, the correction factor N depends on the function of the current pulse generator.

In a preferred embodiment of the volume determination, the correction takes place continuously by skipping every Nth pulse when emitting pulses from the apparatus. This is the easiest way of carrying out the correction. It requires basically just a counter, which, when the number N is reached, emits a signal which results in the emission of a pulse not being carried out.

In order to compensate for the fact that it is entire pulses that are subtracted or added, and in order to achieve still greater accuracy, a further correction is carried out in a preferred embodiment of the invention, which comprises the steps of refraining from, for at least one second period of the volume determination, carrying out the correction that is carried out during the first period.

When the first correction is carried out continuously by skipping every Nth pulse, the second correction can suitably be carried out by the apparatus refraining from the skipping once for every Mth pulse.

The above-described pulse correction can be effected in a simple manner with regard to the volume flow rate when dispensing the liquid. To this end, the volume flow rate is determined when dispensing, and the correction factor, for instance N and, if required, also M, is selected corresponding to the volume flow rate.

It has been found convenient that the predetermined number of pulses that is to be achieved after the pulse correction is at least 100 pulses per liter, preferably 400 pulses per liter. A smaller number of pulses results in too low a resolution of volume.

In an apparatus according to the invention, the above-described pulse correction is accomplished by correction means which are adapted to carry out the correction according to any one of claims 1–7. Preferably the correction means are realized as a processor unit and its associated software. However, it should be possible to realize them by discrete logical circuits, or as a combination of discrete logical circuits and software, but this would be more expensive.

As mentioned above, the apparatus emits a number of pulses which in prior-art manner represents a volume. These pulses are then converted into a direct volume measure. The conversion can, of course, also be made in the actual volume determining apparatus, which may comprise means for this purpose.

A further object of the invention is to provide a method for calibrating an apparatus for volume determination, which is adapted to the inventive method for volume determination.

This object is achieved by a method according to claim 8, which confers essentially the same advantages as the volume determination method and which is easy to carry out.

When calibrating, the pump unit is made to dispense a predetermined calibration volume of the liquid. The dispensed volume can be determined by the user in prior-art manner by means of a precalibrated pitcher. During dispensing, the number of pulses generated by the pulse generator is counted. Then the size of the correction factor is determined and stored in the apparatus to be used in the volume determination. In a preferred embodiment, the correction factor consists of the above-mentioned integer N. Also the correction factor M can suitably be determined and stored in the apparatus.

The determination of the correction factor can in fact be effected outside the actual apparatus, but in a preferred embodiment, the apparatus performs on its own all the calculations required for the calibration, in which case all manual input of data in connection with the calibration is avoided. The predetermined number of pulses per unit of volume, i.e. the number of pulses to be output from the correction means for a given volume, is then stored in the apparatus.

If the apparatus can be calibrated for several different volumes, various pulse numbers corresponding to various volumes can advantageously be stored in the apparatus. The desired pulse number can be indicated by, for instance, intervals or tolerances. In this way, the apparatus can, when calibrating, decide on its own for which volume the calibration takes place. This means that also these data need not be input when calibrating and thus the reliability during calibration increases.

The pulse correction is described above as being carried out for pulses. Of course, the method can be carried out in exactly the same manner if, instead of pulses, pulse edges are counted. In this application, reference is made to pulses only so as to not burden the specification unnecessarily. Thus, this term should here also comprise pulse edges.

BRIEF DESCRIPTION OF THE DRAWINGS

The invention will be described below with reference to the accompanying drawings which show embodiments and in which.

DETAILED DESCRIPTION OF THE PREFERRED EMBODIMENT

Figure 1:
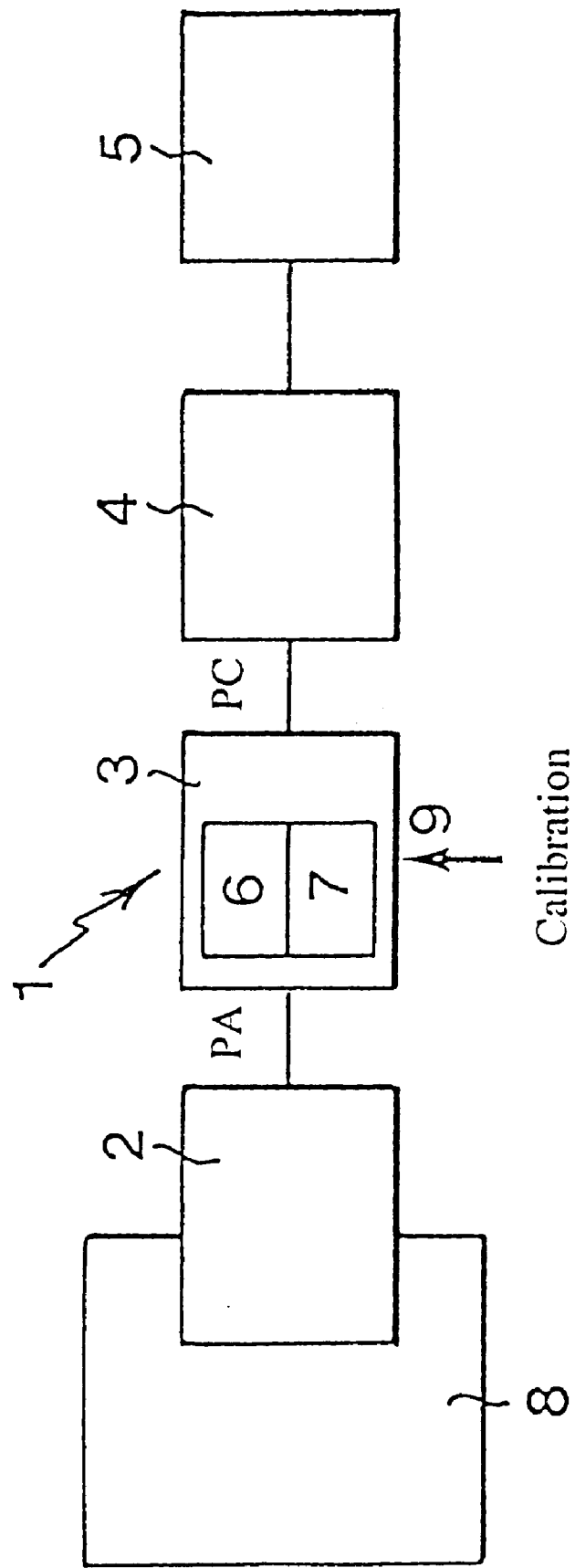
FIG. 1 is a schematic block diagram of an embodiment of an apparatus for carrying out volume measurement.

FIG. 1 shows schematically how an automatically calibratable apparatus of the present invention for determining the volume of liquid, such as fuel, is composed and arranged. In this embodiment, the apparatus is referred to by the reference numeral 1 and comprises a pulse generator 2, a pulse correction unit 3, a fuel pump computer 4 and a volume counter 5.

The apparatus 1 is adapted to be arranged in a pump unit for fuel, for example. The pulse generator 2 is adapted to generate pulses corresponding to the volume flow rate when dispensing fuel from the fuel pump unit. To this end, the pulse generator 2 is arranged adjacent to the metering means 8 of the fuel pump unit. Depending on the type of pulse generator, some part of the pulse generator 2 can besides be arranged in the metering means.

The pulse generator 2 emits pulses PA to the pulse correction unit 3, which comprises a processor unit 6 with memory means 7 for storing correction factors and programs for carrying out the calibration and volume determination according to the invention. The pulse correction unit 3 further comprises an input 9, through which an operator can enter a calibration signal. When the pulse correction unit 3 is correctly calibrated, it corrects the number of pulses in such a manner that when a predetermined volume of fuel flows through the metering means, the pulse correction unit 3 will always emit substantially a predetermined number of pulses independently of how many pulses the specific pulse generator emits for the predetermined volume.

In volume determination, the corrected number of pulses PC is supplied continuously to the pump computer 4, where the pulses are processed in traditional manner and used for controlling the volume counter 5, which indicates the dispensed volume to the user. The pump computer 4 can thus function in the same manner for all fuel pump units independently of the function of the specific pulse generator 2, since it will always receive substantially the same number of pulses per unit of volume.

Figure 2:
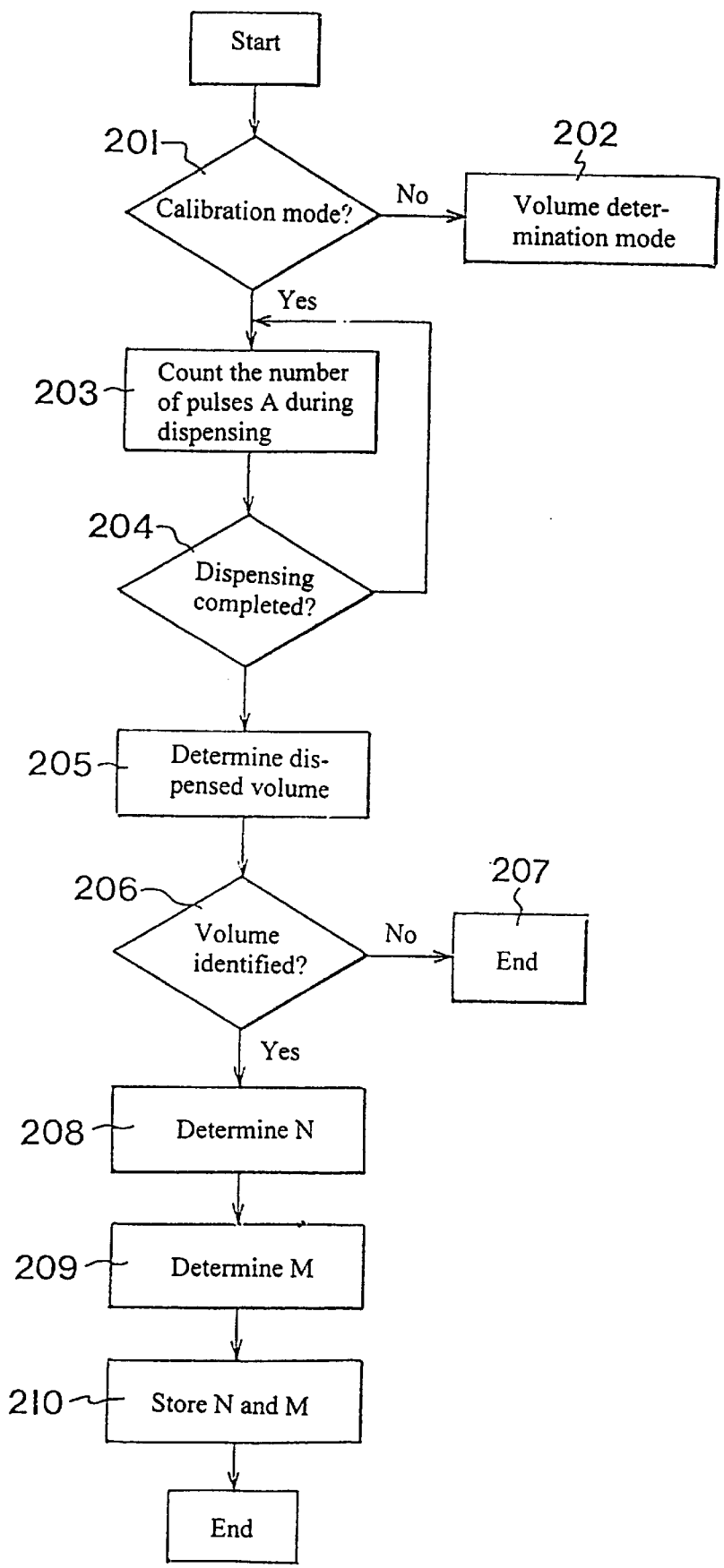
FIG. 2 is a flow diagram of a preferred embodiment of the inventive calibration.

With reference to the flow diagram in FIG. 2, a description follows below of how the pulse correction unit 3 can be calibrated for a specific pulse generator 2. In this embodiment it is assumed that the pulse generator generates more pulses per unit of volume than the predetermined, ideal number of pulses per unit of volume that is to be output from the pulse correction unit 3, and that the correction is carried out by skipping, at regular intervals, the output of a pulse from the pulse correction unit. Furthermore, it is assumed that the predetermined number of pulses per unit of volume has already been stored in the memory means 7, as well as a number of pulse intervals, each corresponding to a given calibration volume.

When the pulse correction unit is to be calibrated, the operator puts the pulse correction unit 3 in calibration mode by giving a calibration signal on the input 9 of the unit. This can take place, for instance, by the operator pressing a calibration button. When the pulse correction unit detects that it is in calibration mode, step 201, it performs the steps described below in the subsequent dispensing of fuel. If it is not in calibration mode, the pulse correction unit processes the subsequent dispensing of fuel as a normal dispensing for which the volume is to be determined, step 202.

When the operator has put the pulse correction unit in calibration mode, he dispenses a predetermined volume of fuel from the fuel pump unit. During dispensing, the pulse correction unit counts the number of pulses generated by the pulse generator during dispensing, step 203.

When the volume of fuel selected by the operator has been dispensed, which is determined by the operator by means of a calibrated pitcher, the operator signals on the input 9 of the pulse correction unite 3 that the dispensing operation is completed. When the pulse correction unit 3 detects this signal, step 204, it proceeds to step 205 and determines the volume that has been dispensed. This is carried out by comparing the counted number of pulses with the pulse intervals stored in the memory means 7. If the counted number of pulses is within one of these intervals, the pulse correction unit determines that the corresponding volume has been dispensed. If the counted number of pulses is not within one of the stored pulse intervals, it determines that no volume could be identified, step 206, and that the calibration therefore could not take place, whereupon the calibration is interrupted, step 207.

If a dispensed volume has been identified, the pulse correction unit determines, in step 208, a first correction factor N as follows:

$$N=INT\ (A/(A-k))$$

wherein INT is the integer part of the expression within parentheses, A is the number of pulses received from the pulse generator, k is the predetermined, ideal number of pulses for the identified, dispensed volume, and N indicates the number of pulses which the pulse correction unit should receive before refraining from outputting a pulse for effecting a correction.

Subsequently, the pulse correction unit determines, step 209, a second correction factor M as follows:

$$M=k/\ (k-INT(A*(N-1)/N))$$

wherein INT, A, k and N have the same meaning as above. M is used for correction of the decimal error that may arise when correcting by means of the correction factor N. The decimal error correction means that the pulse correction unit, for every Mth received pulse, refrains from carrying out the following correction carried out for every Nth pulse.

Finally, N and M are stored in the memory means 7 in the pulse correction unit, step 210, before completion of the calibration. Preferably, also the number of pulses A generated by the pulse generator 2 is stored in the memory means.

Example

Now supposing that the ideal number of pulses is 400 pulses per liter and that the pulse interval stored in the memory means 7 and 5 liters of fuel is 2000–2160 pulses. Assume further that, during calibration, the pulse correction unit receives 2077 pulses from the pulse generator when dispensing 5 liters of fuel from the fuel pump unit. The pulse correction unit then determines that 5 liters have been dispensed and that the ideal number of pulses is 2000. The pulse correction unit further calculates N as follows:

$$N=INT(2077(2077-2000))=26.$$

Thus, this means that in the volume determination, every 26th pulse is to be skipped in order to output substantially the ideal number of pulses from the pulse correction unit.

By using the correction factor N, exactly the ideal number of pulses will not be obtained in all cases. The number of pulses obtained when dispensing 5 liters of fuel can be determined as follows: p=INT(A*(N−1)/(N)), which in this example becomes 1997, which yields an error of 0.15%.

In order to further reduce the error, the second correction factor M is used, which in this case becomes 666. When the pulse correction unit has received 666 pulses, the subsequent correction by skipping should thus not be carried out. In this example, the use of M means that the pulse correction unit will output 2000 pulses for 5 liters.

The calibration can, of course, be carried out for a number of different volumes. Moreover, the calibration can be effected for different flow rates, in which case the flow rate when dispensing can be determined by counting the number of pulses generated per unit of time.

Figure 3:
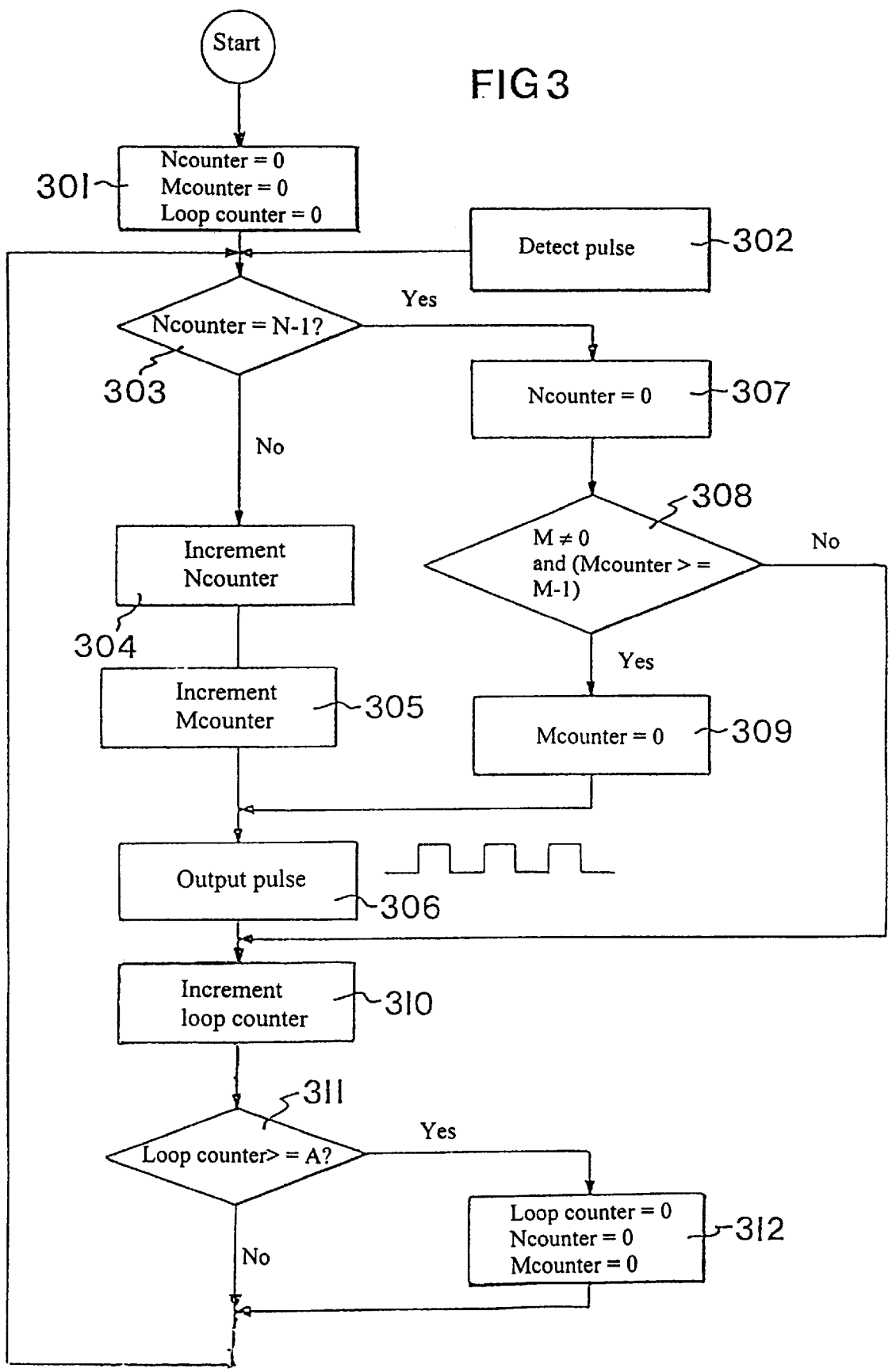
FIG. 3 is a flow diagram of a preferred embodiment of the inventive volume measurement.

A presently preferred embodiment of the volume determination according to the invention will be described below with reference to the flow diagram in FIG. 3.

To keep a check when a pulse is to be skipped or not, the pulse correction unit uses two variables Ncounter and Mcounter. Moreover, use is made of a variable which is designated loop counter. These variable are set at zero, step 301, after each calibration.

When the pulse correction unit detects a pulse from the pulse generator, stet 302, it investigates whether the value of the Ncounter equals N−1, step 303. If this is not the case, the Ncounter is incremented by 1, step 304, and the Mcounter by 1, step 305. Then the pulse correction unit proceeds to step 306. If, on the other hand, the value of the Ncounter equals N−1, it is set at zero, step 307. Subsequently, the pulse correction unit investigates whether M differentiates from zero and if the value of the Mcounter is greater than or equal to M−1, step 308. If this is the case, the Mcounter is set at zero, step 309, and the pulse correction unit proceeds to step 306, in which the pulse correction unit outputs a pulse to the pump computer and then proceeds to step 310, in which the loop counter is incremented by 1. If the condition in step 308 is not satisfied, the pulse correction unit proceeds to step 310, in which the loop counter is incremented. After step 310, the pulse correction unit checks in step 311 if the value of the loop counter is greater than or equal to A, which is the number of pulses generated by the pulse generator 2 during calibration when N and M were determined. If this is the case, the loop counter, the Ncounter and the Mcounter are cleared in step 312. Finally, the pulse correction unit 3 returns to step 302. By operating in measuring periods corresponding to A generated pulses and clearing all counters between the measuring periods, the errors are minimized.

If the volume determination is to be carried out with regard to the flow rate when dispensing fuel, various N and M can be determined for various flow rates. In the volume determination, N and M are then selected corresponding to the flow rate. Alternatively, one or more compensation factors can be used to accomplish flow compensation.

It is understood that the present invention is not limited to the pumping of fuel but is equally applicable to the pumping of any liquid.

What is claimed is:

1. A method for determining the volume of fuel being dispensed from a fuel pump unit, comprising the steps of:
    generating pulses by means of pulse generator corresponding to a volume flow rate when dispensing liquid, and
    correcting the number of pluses generated by the pulse generator by at least one correction factor, thereby emitting substantially a predetermined number of pulses per unit of volume of liquid that is being dispensed, the step of correcting comprising:
    one of the steps of disregarding a number of pulses of the pulses generated by the pulse generator and emitting a number of pulses in addition to the pulses generated by the pulse generator,
    one of the correcting steps being carried out for every Nth generated pulse for at least one first period of a volume determination where N constitutes said correction factor and is an integer which is greater than one and which has been predetermined for said pulse generator,
    neither of the correcting steps being carried out for at least one second period of the volume determination.

2. The method as claimed in claim 1, wherein the measure of disregarding a number of the pulses generated by the pulse generator comprises skipping every Nth generated pulse when emitting pulses.

3. The method as claimed in claim 1, wherein the measure of disregarding a number of the pulses generated by the pulse generator comprises skipping every Nth generated pulse when emitting pulses, but, for every Mth generated pulse, refraining once from carrying out the skipping, M being an integer which is greater than N and which is predetermined for said pulse generator.

4. A method for calibrating an apparatus for determining the volume of liquid being dispensed from a liquid pump unit and including a pulse generator adapted to generate pulses corresponding to the volume flow rate when dispensing liquid, and means for correcting the number of pulses generated by the pulse generator by at least one correction factor, such that the apparatus emits substantially a predetermined number of pulses per unit of volume of dispensed liquid, the method comprising the steps of:
    making the liquid pump unit dispense a predetermined calibration volume;
    counting the number of pulses generated by the pulse generator when dispensing the calibration volume;
    determining the size of the correction factor by means of said predetermined number of pulses, the size of the predetermined calibration volume and the counted number of pulses, the correction factor indicating one of a number of pulses of the pulses generated by the pulse generator, which the apparatus should disregard when emitting pulses, and a number of pulses in addition to the pulses generated by the pulse generator, which the apparatus should emit;
    storing the correction factor in the apparatus to be used in the determination of liquid volume;
    wherein the correction factor is an integer N, which is such that if the apparatus, when emitting the pulses, skips every Nth generated pulse, the apparatus will emit substantially the predetermined number of pulses per unit of volume;
    determining a further correction factor, which is an integer M, which is greater than N and which is such that if the apparatus, for every Mth generated pulse, refrains once from carrying out the skipping, a pulse number is obtained which is closer to the desired pulse number than that obtained if the skipping is carried out every time; and
    storing the integer M in the apparatus to be used in the determination of liquid volume.

5. The method as claimed in claim 1, wherein the predetermined number of pulses per unit of volume is stored in the apparatus, and wherein the steps of counting the number of pulses, determining the correction factor and storing the correction factor are carried out automatically by the apparatus.

6. A method for calibrating an apparatus for determining the volume of liquid being dispensed from a liquid pump unit and including a pulse generator adapted to generate pulses corresponding to the volume flow rate when dispensing liquid, and means for correcting the number of pulses generated by the pulse generator by at least one correction factor, such that the apparatus emits substantially a predetermined number of pulses per unit of volume of dispensed liquid, the method comprising the steps of:

making the liquid pump unit dispense a predetermined calibration volume;

counting the number of pulses generated by the pulse generator when dispensing the calibration volume;

determining the size of the correction factor by means of said predetermined number of pulses, the size of the predetermined calibration volume and the counted number of pulses, the correction factor indicating one of a number of pulses of the pulses generated by the pulse generator, which the apparatus should disregard when emitting pulses, and a number of pulses in addition to the pulses generated by the pulse generator, which the apparatus should emit;

storing the correction factor in the apparatus to be used in the determination of liquid volume; and storing a plurality of pulse numbers, each corresponding to a predetermined volume, in the apparatus, and enabling the apparatus to determine the size of the calibration volume by comparing the counted number of pulses with said plurality of predetermined pulse numbers.

\* \* \* \* \*